United States Patent [19]

Shaw

[11] 3,714,320
[45] Jan. 30, 1973

[54] COLD EXTRUSION PROCESS

[75] Inventor: Robert B. Shaw, Orinda, Calif.

[73] Assignee: Shell Oil Company, New York, N.Y.

[22] Filed: Sept. 30, 1968

[21] Appl. No.: 798,490

Related U.S. Application Data

[62] Division of Ser. No. 304,239, Aug. 23, 1963, abandoned.

[52] U.S. Cl. .............................. 264/323, 264/176 R
[51] Int. Cl. ................................................ B28b 3/20
[58] Field of Search......264/210, 319, 320, 230, 231, 264/330, 331, 176, 248, 323; 18/8 A

[56] References Cited

UNITED STATES PATENTS

| | | | |
|---|---|---|---|
| 3,074,115 | 1/1963 | Albrecht et al. | 264/323 |
| 2,987,775 | 6/1961 | Albrecht et al. | 264/323 |
| 2,458,327 | 1/1949 | Wood | 264/275 |
| 2,953,816 | 9/1960 | Kidder | 264/323 |
| 3,173,342 | 3/1965 | Wilson | 264/320 |
| 3,340,714 | 9/1967 | Pohl et al. | 264/320 |
| 3,389,203 | 6/1968 | Merges et al. | 18/12 A |
| 3,466,214 | 9/1969 | Polk et al. | 264/248 |
| 2,244,208 | 6/1941 | Miles | 264/320 X |
| 2,321,047 | 6/1943 | Salgberg | 264/320 X |
| 3,079,642 | 3/1963 | Needham et al. | 264/320 X |
| 3,093,526 | 6/1963 | Price et al. | 264/230 X |
| 3,388,931 | 6/1968 | Johnson et al. | 264/230 X |
| 3,460,951 | 6/1969 | Heyl | 264/230 X |
| 2,867,848 | 1/1959 | McGlamery | 264/210 B X |
| 3,083,410 | 4/1963 | McGlamery | 264/289 X |
| 3,194,863 | 7/1965 | Williams et al. | 264/210 X |
| 3,290,420 | 12/1966 | Orser | 264/210 |
| 3,324,217 | 6/1967 | Armstrong et al. | 264/210 |
| 3,340,235 | 9/1967 | Holt | 264/288 X |
| 3,354,023 | 11/1967 | Dunnington et al. | 264/288 X |

*Primary Examiner*—Jay H. Woo
*Attorney*—Martin S. Baer

[57] ABSTRACT

Polypropylene articles of high impact resistance at low temperatures and of improved tensile properties which permit their use at substantially higher tensile loads than conventionally produced articles of polypropylene, are produced by deforming the polypropylene in the solid state under compressive stress. A form of polypropylene is disclosed which is characterized by absence of inhomogeneous deformation under tension, absence of whitening under tension until strained beyond 150 percent deformation, ductility at temperatures of 0°C and below, and an apparent glass transition temperature, determined by torsional damping at 1 cycle per second, of about 15°C.

1 Claim, No Drawings

COLD EXTRUSION PROCESS

This application is a division of Ser. No. 304,239, filed on Aug. 23, 1963, now abandoned.

This invention relates to polyolefin articles having improved properties. More specifically it relates to polypropylene articles having improved properties at low temperatures and to methods for their preparation.

Solid polypropylene is a thermoplastic polymer which has recently achieved commercial importance. By use of appropriate conditions and catalysts it can be produced in sterically regulated forms, including that known as isotactic polypropylene. While it is difficult, if not possible, to polymerize propylene to a polymer which has 100% stereoregular structure, it is nevertheless possible to produce with commercially practical catalysts polypropylene having a high proportion of segments that have complete steric regularity. A property which is associated with steric regularity of polypropylene is the capacity of a melt thereof to solidify in crystalline form.

Crystalline polymers, in their usual form, have some outstandingly good properties and some undesirable ones. Desirable properties of highly crystalline polypropylene are its high melting temperature, high tensile strength and substantial hardness.

A substantial disadvantage of polypropylene as heretofore known is the fact that under increasing tension polypropylene articles reach a yield point at which non-uniform or inhomogeneous deformation or necking takes place. In such deformation the article is stretched, once it has reached its yield point, substantially beyond its original length with no increase in applied force. Although in conventional polypropylene the tensile stress at break may be greater than the yield stress, this is generally of no practical significance since in most articles inhomogeneous deformation cannot be tolerated. While inhomogeneous necking of polypropylene for films and fibers may be prevented by drawing, no practical methods have been disclosed for preventing inhomogeneous necking in polypropylene articles of substantial thickness.

A further undesirable characteristic of polypropylene is that polypropylene articles which are originally clear or translucent are permanently whitened when stretched to about the yield point. Whitening also is caused by bending or impact. While such whitening does not appear to affect the strength of the articles adversely, it causes an undesirable, unsightly appearance. Whitening is highly objectionable in many commercial products.

A major disadvantage of crystalline polypropylene is its brittleness at low temperatures and its lack of resistance to impact at low temperatures. Low temperatures here refers to temperatures below 10°C, and particularly 0°C and below. Methods have been suggested for making polypropylene less brittle at low temperatures and for improving the impact resistance. The most generally adopted methods to date consist of blending polypropylene with a substantial amount, e.g., from 1 to 20 percent, of rubbery polymers in finely divided form. Another recently suggested method consists of modifying the polypropylene structure by various types of block polymerization. So far as is now known, all of these methods result in polypropylene having a substantially lower tensile strength than comparable unmodified polypropylene. Moreover, high impact blends also are subject to objectionable whitening.

An obvious disadvantage of the known methods for overcoming the poor low-temperature properties of polypropylene is that they involve substantial additional manufacturing costs, either in blending operations or in controlled block polymerizations.

The methods of this invention now permit for the first time dramatic improvements in the low-temperature properties of polypropylene articles of substantial thickness, i.e., other than films or fibers, at no significant sacrifice in tensile strength. Polymer properties are improved according to the invention without any chemical modification of the polymer composition whatever. An additional advantage is that polypropylene articles treated according to the method of this invention no longer show any inhomogeneous necking phenomenon and do not whiten at the first yield point, and can therefore be utilized at substantially higher tensile loads than conventional polypropylene. A further advantage is that polypropylene articles of greatly improved clarity can be produced according to this invention.

Polypropylene articles produced according to the preferred modes of this invention are found to consist of a heretofore unknown physical form of polypropylene, characterized by a combination of (1) retention of spherulitic structure; (2) absence of inhomogeneous deformation under tension; (3) absence of whitening under tension until strained far beyond the secondary yield point; (4) ductility at temperatures substantially below 0°C, and consequently improved resistance to impact at low temperatures; and (5) an apparent glass transition temperature, as found by torsional damping at 1 cycle per second, of about 15°C.

Broadly, the method of this invention consists of subjecting stereoregular solid polypropylene articles to cold working by application of mechanical compressive stress sufficient to cause flow of the solid polymer at a temperature below its melting point.

The following are the major objects of this invention:

To provide polypropylene articles which are not brittle at low temperature and which have good impact properties at low temperatures;

To provide polypropylene articles which show no inhomogeneous necking and which can be utilized at tensile loads substantially in excess of their yield stress;

To provide articles which are made of chemically conventional polypropylene compositions normally associated with low impact strength at low temperatures, but which have greatly improved low-temperature properties, including impact resistance, by virtue of simple mechanical treatments;

To provide polypropylene articles of improved clarity;

To provide polypropylene articles which do not show the characteristic effects of glass transition temperature;

To provide improved polypropylene sheet for deep drawing;

To provide a method for deep-drawing polypropylene;

To provide polypropylene articles of substantial thickness, capable of being utilized by shrink-fitting;

To provide press formed polypropylene articles;

To provide methods of treating polypropylene articles by which low-temperature impact resistance and other properties are improved;

To provide novel methods of forming and shaping polypropylene articles.

Other objects will become apparent from the following description of the invention.

EMBODIMENTS OF THE INVENTION

In a preferred embodiment this invention consists of a method of producing articles from crystalline polypropylene in which a polypropylene article is worked at a temperature below its melting point by application of mechanical pressure in the direction in which thickness is measured, pressure being applied alternately in at least two directions at about right angles to each other in the plane of the work piece, i.e., biaxially, whereby the article is deformed and its thickness reduced by at least 10 percent and preferably to from 40 percent to 70 percent of the original thickness.

In an especially preferred embodiment, polypropylene sheet of substantial thickness is rolled at a temperature below its melting point in repeated passes made an equal number of times in different directions to cause deformation in all directions of the sheet, whereby its thickness is reduced to a percentage in the above range. It is especially preferred to make equal numbers of alternate passes at about right angles to each other. This method, described in more detail hereinafter, will be designated "biaxial cold rolling". Biaxial rolling may be modified, e.g., by rolling in multiple directions other than at right angles, or by not having a precise balance in the number of passes in directions at right angles, so long as the overall effect substantially equals biaxial rolling, as indicated by equal deformation along two axes at right angles in the plane of the sheet.

In another preferred embodiment, polypropylene articles are produced by pressure forming or pressing, i.e., by subjecting a polypropylene work piece which may have been produced by conventional extrusion, molding, or the like, to mechanical pressure in a mold or closed die under such conditions that the piece is deformed into the shape of the mold or die without being heated to its melting point.

In another embodiment, polypropylene rod is drawn through a series of dies at conditions at which no necking occurs, whereby the forces applied simultaneously at all angles perpendicular to the axis of the rod result in reduction of the area of the rod by at least 10 percent and preferably to from 40 to 70 percent of its original cross-sectional area.

In another embodiment polypropylene rod is swaged by repeated hammering of a swaging die, whereby its cross-sectional area is reduced by at least 10 percent and preferably to from 40 to 70 percent of its original cross-sectional area.

In another embodiment polypropylene shapes are produced by cold extrusion, i.e., by extrusion through a die under conditions at which the polypropylene never is heated to its melting point.

In another embodiment, polypropylene rods or rod-like shapes are produced by rolling under pressure.

In another embodiment, polypropylene shapes are produced by drawing rods or rod-like shapes through a turk's head.

In another embodiment, polypropylene tubes are produced from solid rods or are changed in shape by rolling or hammering on a mandrel.

In another embodiment, polypropylene articles are peened to produce articles having good impact resistance.

In other embodiments of this invention, polypropylene articles of improved physical properties, prepared by one of the above-mentioned embodiments, are subjected to further and different shaping methods. A preferred embodiment hereunder comprises deep-drawing of biaxially cold rolled sheet. Another comprises stamping of cold rolled sheet.

In other embodiments, articles produced according to the invention are subjected to heat treatments at temperatures below the melting point of polypropylene. These heat treated articles may then be subjected to further working or shaping, either by cold working according to this invention or by other methods.

A less preferred embodiment, in which not all the possible property improvements of cold working are obtained, consists of working a work piece by a single directional application of pressure or by multiple applications of pressure in essentially the same direction, as in cold rolling in a single pass or in multiple passes in the same direction, i.e., uniaxial or unidirectional rolling.

It will be understood that not all the embodiments described above result in articles having identical physical characteristics. The several embodiments are not full equivalents of each other. Each has certain characteristics which may make it the method of choice in some particular application.

Other embodiments of this invention consist of articles of stereoregular polypropylene such as produced by the above-enumerated embodiments, having improved physical properties such as low temperature impact resistance, clarity, and the property of not inhomogeneously deforming under tension.

One specific preferred embodiment of this invention consists of articles of stereoregular propylene characterized by the combination of physical properties enumerated hereinbefore.

STARTING MATERIALS

The articles of this invention are most suitably produced from polypropylene which is obtained by polymerizing propylene with a highly stereospecific catalyst system. A great variety of stereospecific catalysts have been described in the literature. Known effective catalysts are species or modifications of the so-called Ziegler catalyst; that catalyst consists broadly of two-component systems comprising a compound of Group 4b, 5b, 6b, or 8 of the Periodic Table of the Elements, as illustrated on pages 448 and 449, Handbook of Chemistry and Physics, The Chemical Rubber Publishing Corp., 44th Edition, 1962, and a metal from Group 1a, 2a or 3a, or an alloy or hydride or organic derivative of such metal having an organometallic bond. Suitable catalysts are described in the references listed on pages 350–361 of "Linear and Stereoregular Addition Polymers" by Gaylord and Mark, Interscience Publishers, Inc., New York (1959). Since stereoregular polypropylenes are now well-known materials of commerce, their preparation need not be further described here. The common and generally preferred stereoregular form of polypropylene is that known as isotactic.

Following conventional terminology, reference to "crystallizable" or "stereoregular" polymers means, unless the context indicates otherwise, solid polymers having a high degree of crystallizability or stereoregularity, reflected in a crystallinity of at least 50 percent, as determined by X-ray diffraction analysis of a crystallized sample or by other appropriate known methods, when solidified under conditions which favor crystallization. In general, polypropylene having a crystallizability of this order contains at most only a small proportion of material which is extractable in paraffinic hydrocarbons of up to gasoline boiling range. Typically, the proportion of a highly crystallizable polypropylene which is extractable in boiling heptane or isooctane is less than 10 percent and usually less than 5 percent. Similarly, "crystalline" polymers are those which have solidified in a highly crystalline structure due to their molecular arrangement and composition and the conditions at which the melt was cooled. Normally solid isotactic polypropylene usually has a viscosity average molecular weight of at least about 40,000 but generally between 100,000 and 1,200,000. For convenience, the molecular weight is usually indicated by intrinsic viscosity. The intrinsic viscosity of polypropylene, measured in decalin at 150°C, expressed in dl/g, may be as low as 0.5 or less and as high as 10 or more, but is usually between 1 and 4.5.

Conventional methods of modifying polypropylene for various commercial purposes can be employed in polymer used according to this invention. This includes the use of oxidation inhibitors, heat stabilizers, ultraviolet stabilizers, flow promoting agents, slip additives and the like. Selection can be made from the great variety of materials of these various classes which are known to the art. The group of typical suitable antioxidants comprises various phenolic compounds, such as 2,6-di-tert.butyl-4-methylphenol, bis(2-tert.butyl-5-methyl-4-hydroxyphenyl)sulfide, 1,1,3-tris(2-methyl-6-tert.butyl-4-hydroxyphenyl)butane, 1,3,5-trimethyl-2,4,6-tri(3,5-di-tert.butyl-4-hydroxybenzyl)benzene and oxycresyl camphene; zinc dibutyl dithiocarbamate; and combinations of such compounds with sulfur compounds such as dilauryl thiodipropionate or dicetyl sulfide.

The group of typical suitable U.V. stabilizers comprises benzophenones such as 2-hydroxy-5-dodecoxybenzophenone, 2-hydroxy-5-octoxybenzophenone; complexes such as the nickel phenolate of a monosulfide of bis(p-octylphenol); and benztriazine derivatives.

Polypropylene may be further stabilized by addition of additives of the type heretofore used in stabilizing polyvinylchloride, as elaborated in U.S. Pat. No. 2,985,617 to Salyer et al.

Polypropylene may be modified by incorporating therein organic molecules or organic or inorganic compounds of metals to provide improved dyeability characteristics or other improved properties.

In some cases the polypropylene may also contain substantial proportions of pigments for coloration, or of conventional fillers.

The selection of an individual additive will not ordinarily adversely affect the suitability of polypropylene for working according to this invention. However, the effect of any desired additive can be easily tested by processing a sample specimen according to this invention and determining its properties by suitable tests, as illustrated herein.

This invention makes it unnecessary to modify polypropylene by incorporating rubbery polymers. The full advantages of the invention are not obtained when polypropylene blended with rubbery polymers is employed.

In the preferred embodiments, the methods of this invention apply to polypropylene articles having an initial thickness of at least about 0.05 inch (50 mils). A preferred range of thicknesses for cold rolling is from about 0.5 to about 0.05 inch. However, thicker articles may also be worked by cold rolling. In some methods, as in peening, when only the outer layer is to be modified, the article may have any desired substantial thickness.

While the invention is particularly directed to the production of articles made from crystallizable polypropylene, some of its advantages may also be obtained when articles prepared from other stereoregular crystallizable polymers are worked according to this invention. Included are block-copolymers predominantly consisting of stereoregular polypropylene blocks, and of minor amounts, e.g., up to 20 percent, of blocks of homopolymer or copolymers, particularly of ethylene or ethylene-propylene copolymer.

PROPERTIES OF THE NOVEL POLYPROPYLENE ARTICLES

One of the critical factors in determining the properties of articles produced according to some of the embodiments of this invention is the percentage of reduction from the original thickness (or cross-sectional area, in the case of rod-like shapes) resulting from working according to the invention.

For purposes of this discussion percentage reduction in thickness is defined by the following equation:

$$\text{Percentage reduction} = (T_o - T_f)/T_o \times 100$$

where $T_o$ is the original thickness and $T_f$ is the final thickness. Similarly, reduction in cross-sectional area is defined by $$\text{Percentage reduction} = (A_o - A_f)/A_o \times 100$$

where $A_o$ is the original cross-sectional area and $A_f$ the final one.

Several desirable properties are found or are fully developed only after a minimum percentage reduction in thickness has taken place. Some properties thereafter improve further and some remain essentially unchanged even with substantially greater reduction in thickness. Some properties improve, go through a maximum, and deteriorate as large further percentage reduction in thickness takes place.

In processes such as cold rolling of sheet, in which reduction in thickness in each pass is only in one direction in the plane of the sheet, the properties of the processed article are sensitive to the directionality of the treatment. By applying pressure in multiple passes (at least two) in at least two directions substantially at right angles to each other in the plane of the sheet, substantial anisotropy in the article in the plane of the sheet is avoided. Such anisotropy results in the article being unequally affected in properties such as impact and tensile properties. In the case of such anisotropy, some physical properties may show directional differences while others may be unchanged from those of unworked articles of the same dimensions.

The effects of cold working according to this invention will be discussed in the following sections. Unless otherwise stated, the articles tested were made of isotactic polypropylene sheet which was reduced in thickness by means of biaxial cold rolling in multiple passes.

Tensile Properties

Tensile properties are determined according to a modification of the standard method of the American Society for Testing Materials (ASTM) designated "Tentative Method of Test for Tensile Properties of Plastics", ASTM D 638–61T. In this test, a tensile bar is placed under tension by a pull at a controlled rate. The results may be plotted as a graph of engineering stress versus strain or percentage elongation. Engineering stress is the nominal tensile stress, i.e., the tensile load per unit area of minimum cross-section of the specimen (within the gage boundaries) prior to application of tensions.

Stress-strain diagrams were made for a series of seven samples of polypropylene. Sample 1 represents polypropylene sheet of ⅛-inch thickness, prepared by extrusion, to which no cold-working has been applied. Samples 2–7 represent sheets reduced in thickness by different percentages by means of biaxial cold rolling at room temperature. The samples had a gage length of 0.5 inch and were tested at room temperature at a strain rate of 0.4 in/in/min.

The first point at which an increase in strain occurs without an increase in stress is defined as the yield point (YP). The yield point of conventional polypropylene is followed by a reduction in stress at increasing strain until the secondary yield point is reached. After the secondary yield point there is observed a long, level stretch of the diagram, which corresponds to inhomogeneous necking of the sample; biaxially cold rolled samples do not show this.

Tensile properties of the series of test pieces are shown in Table 1.

TABLE 1

| Sample Number | 1 | 2 | 3 | 4 | 5 | 6 | 7 |
|---|---|---|---|---|---|---|---|
| Percent Reduction in Thickness of Rolled Sheet | 0 | 12.5 | 22 | 31 | 41 | 50 | 60 |
| Inhomogeneous Necking Observed | Yes | No | No | No | No | No | No |
| Yield Point, psi × $10^{-2}$ | 41 | 41 | 35.8 | 34.5 | 34 | 33 | 34 |
| Secondary Yield Point, psi × $10^{-2}$ | 28.5 | 30 | 29 | 29.5 | 31 | 32 | (a) |
| Point at Which Whitening Observed | | | | | | | |
| Stress, psi × $10^{-2}$ | 41 | 36 | 37 | 38.5 | 40 | 45 | 50 |
| Strain, % | 30 | 500 | 500 | 450 | 400 | 400 | 350 |
| Tensile Strength at Break | | | | | | | |
| Stress, psi × $10^{-2}$ | 42 | 43 | 45 | 47.5 | 50 | 57 | 61.5 |
| Strain, % | 800 | 760 | 760 | 720 | 650 | 620 | 550 |

(a) Secondary yield point disappears.

It is seen that there is no longer any measurable amount of inhomogeneous deformation, even after reduction in thickness of as little as 12.5 percent. As the "percent reduction-in-thickness" of the samples increases, e.g., up to 60 percent, there is no longer any significant drop in stress at YP; in other words, the secondary yield point is found to disappear in biaxially cold rolled samples reduced in thickness by 60 percent.

The yield point for sheet rolled to 12.5 percent reduction in thickness was the same as for unrolled sheet. On greater reduction in thickness the yield point was somewhat lower, but since there was no inhomogeneous necking the sample could be used up to about its ultimate tensile strength, which exceeded the yield point strength.

The slope of the straight portion of the stress-strain graph immediately following the "secondary yield point" can be considered a measure of the rate of work-hardening of the specimen. When this slope is plotted against "percent reduction in thickness" it is seen that the slope increases suddenly and significantly at a reduction-in-thickness of about 40 percent.

A phenomenon which is observed when polypropylene is deformed under tension is whitening of the polymer. Such whitening occurs in conventional polypropylene somewhat before the yield point strain, i.e., below 20 percent elongation. In polypropylene articles prepared according to the preferred modes of this invention, whitening during deformation by applied tension is observed only after about 150 to 500 percent elongation. Biaxially cold-rolled sheet can be bent double without noticeable whitening along the fold. In unidirectionally rolled sheet whitening occurs when the sheet is bent double in the direction parallel to the direction of rolling but not when bending is in the direction at right angles to the direction of rolling.

The elongation-to-break is the value of percentage elongation at which the tensile specimen breaks. It was found that elongation-to-break was lower by about 20 to 25 percent when samples having 40 percent reduction in thickness due to biaxial cold rolling are compared with unworked polypropylene. It must be remembered, however, that the preferred modes of this invention permit a polypropylene article to be utilized at strains substantially beyond the yield point, since no significant amount of inhomogeneous necking is incurred and the onset of whitening is deferred. The elongation-to-break in conventional polypropylene has little practical significance because of whitening and inhomogeneous necking. In polypropylene articles according to this invention, strains well beyond the yield point can be tolerated in practice and breaking strength may represent the limiting useful strength.

The above results are typical for polypropylene articles produced according to the most preferred mode of this invention. IT will be realized, however, that the numerical values associated with the tests vary, depending on the conditions under which load is applied, the previous history of the sample, and the like.

Impact Properties

Impact properties were tested on samples which had been biaxially cold rolled to various percentages of reduction in thickness.

Dramatic improvements in impact resistance can be obtained according to this invention. The most useful test for illustrating these is a falling weight test similar to ASTM D 1709-59T. In the test employed herein, a 5-pound weight with a round point of one-quarter inch radius is dropped from varying heights onto an unclamped plaque supported by a three-inch diameter ring. The indicator of impact force is the height, in inches, of the weight before it is dropped. Significant information is obtained from the manner of failure of the sample and from the impact force resulting in failure.

Improvements are also observed when samples prepared according to this invention are tested for tensile impact according to the method of C. C. Bragan, Modern Plastics 33, Part 2, 199 et seq (1956) or for notched Izod impact resistance by ASTM D 256-56.

A significant improvement is also found in the brittle point, ASTM D 746-57T.

In the falling weight test, plaques of commercial conventional polypropylenes and high impact grades of polypropylenes either shattered in a brittle manner or failed by excessive whitening. Specimens produced by biaxial cold rolling did not whiten significantly. Ultimately they failed by ductile puncture.

Specimens biaxially cold-rolled to 50 percent reduction, tested at −20°C, ultimately shattered, but only at drop heights in excess of that required to cause puncture.

Specimens biaxially cold rolled to 75 percent reduction in thickness were observed to fail by shattering associated with delamination.

The impact resistance of specimens biaxially cold-rolled to 50 percent reduction, tested at 0°C, was improved by about 20 times over that of unworked extruded sheet of the same thickness as the specimen. The impact resistance of these rolled specimens was two to three times greater than that of commercial high impact grades of polypropylene, which are blends of polypropylene with rubber. The specimens of commercial high impact polypropylene-rubber blends also failed by shattering, as did unworked polypropylene, as opposed to the ductile behavior of the specimens prepared according to the preferred mode of this invention.

A still greater superiority is apparent if whitening on impact is considered. Rubber blends begin to whiten at a drop height corresponding to that for which unmodified polypropylene shatters, i.e., very much lower than the minimum height required for fracturing them.

Polypropylene articles produced according to the preferred mode of this invention thus are able in a practical manner to resist without significant adverse effect impact many times as great as either conventional polypropylene or conventional high impact grades.

The above discussed tests were carried out on polypropylene sheet of 0.062 inch thickness. Samples reduced 50 percent in thickness to a final thickness of 0.125 inch were found to show only slight denting due to impact from a 50-inch drop of the weight, and only a small amount of haziness at a 69-inch drop, the limit of the falling weight apparatus used in the test.

Impact tests by falling weight, run at −20°C, showed a similar relative improvement of specimens of this invention over commercial impact grades as was observed at 0°C.

Results of impact tests by the falling weight method are shown in Table 2.

TABLE 2

| condition of sheet | Test Thickness of sheet, inches | Test temp. °C | Weight Drop height, in. | remarks |
|---|---|---|---|---|
| Unrolled | .062 | 0 | app. 2 | Shatters |
| Unrolled | .125 | 0 | app. 3 | Shatters |
| 50% rolled | 0.62 | 0 | >45 <50 | ductile puncture |
| 50% rolled | .125 | 0 | 65 | No failure |
| 75% rolled | 0.62 | 0 | >40 <50 | Tear, delamination |
| 50% rolled | .062 | −20 | 36 | ductile puncture |
| Commercial rubber blend | .062 | 0 | 17 | Shatters |

Impact tests carried out by the pendulum tensile impact determination of Bragan on nominally 1/16 inch thick samples also illustrated improvements in impact strength resulting from treatment according to this invention. The relative increase in impact strength is greater at 0°C than at room temperature. Data are shown in Table 3.

Notched Izod impact tests performed on nominally 1/16-inch thick samples at 0°C also showed improvement by treatment according to this invention. Data are shown in Table 3.

The brittle point, determined according to ASTM D 746/57T, showed the removal of 0°C brittleness of the samples by treatment according to this invention. The brittle point was found to be −26°C, compared to +6°C for conventional polypropylene.

The beneficial increase in impact strength appeared to be a function of the total reduction, not of the reduction per pass or the number or order of the passes or the temperature of the sheet being rolled, provided rolling was at temperatures below the melting point, and carried out biaxially.

Structure and Properties Compared with Conventional Polypropylene

It is known that stereoregular polypropylene tends to crystallize on cooling from a melt. The small crystals in the polymer associate in varying numbers of "spherulites", whose size is determined by the conditions of cooling and nucleation. Spherulites are easily seen when thin sections of cooled polymer are observed under polarized light in a microscope.

It is also known that the crystals in such polypropylene can be oriented by applying tension to a polypropylene article, such as film. Biaxial orientation is known to result in substantial increases in tensile strength of the article. In biaxially oriented polypropylene, spherulites are no longer observable, apparently because the crystallites of which they are made up are now aligned in the directions of orientation.

The surprising result of a study of polypropylene sheet prepared by biaxial cold rolling according to this invention is the finding that the spherulite structure of the sheet is not noticeably different from that of conventional unworked polypropylene. In other words, no noticeable degree of orientation of the crystallites in the plane of the sheet is observed. Lack of significant orientation in the plane of the sheet is also confirmed by the fact that tensile modulus is not increased; by contrast, tensile modulus is increased significantly by drawing polypropylene film or fiber. The retention of spherulitic structure is surprising in view of the dramatic changes in impact and some of the tensile properties of such biaxially cold rolled sheet. Although the spherulitic structure is retained, it is obvious from the above-described improvements in properties that a significant change has taken place in the microstructure of the polymer. The nature of the change cannot yet be stated with certainty.

As has been described above, products of this invention fail by a ductile rather than brittle failure even at temperatures of 0°C and −20°C. Such behavior is unknown in conventional stereoregular polypropylene.

A convenient indicator of the temperature separating the brittle from the ductile region of polymer behavior is the plot of damping peak (tan δ) versus temperature. (F. E. Weir, S.P.E. Transaction 2) No. 4, 302–306 (Oct. 1962)). Plots of tan δ versus temperature for conventional polypropylenes show a peak in the range from 0° to about 5°C at about 1 cycle per second, depending on the polymer characteristics. This peak is taken as an indication of the glass transition point. The glass transition point is explained as that temperature at which the amorphous material in polypropylene changes from a non-rigid to a rigidly frozen glassy state in which it is no longer capable of absorbing mechanical energy and thus exerting a damping action. Conventional high impact polypropylenes, which are blends of small amounts of rubber in stereoregular polypropylene, show two damping peaks, one in the usual range for polypropylene and one at a lower temperature due to the rubber component of the blend.

An entirely unexpected finding on testing biaxially cold-rolled polypropylene, produced according to this invention, is that the damping peak at 1 cps is at a much higher temperature than heretofore known for polypropylene, namely about 15°C. According to everything known heretofore about polypropylene, this would lead one to believe that the glass transition temperature is at 15°C and that the polymer would be brittle at temperatures below 15°C. As has been shown above, this is not the case and the damping peak in articles according to this invention does not have the significance that it has in polypropylene heretofore known. This phenomenon is further confirmation that some hitherto unobserved unusual change has taken place.

The comparison of physical properties of polypropylene sheet prepared by biaxial cold rolling, according to rolling schedule I of Example 1 to 50 percent reduction in thickness with those of extruded polypropylene sheet of the same thickness, i.e., 0.062 inch, which has not been cold worked, is shown in Table 3. The significant changes in tensile and impact properties shown by these tests have been discussed above. It will be observed that there is no significant change in the heat distortion temperature and the tensile modulus. The change in shear modulus is not considered significant. There is no significant change in hardness as measured by the "Shore D" test but some reduction in hardness measured by the "Rockwell R" test.

TABLE 3

| | Polypropylene Sheet Prior Art | This Invention |
|---|---|---|
| Hardness, Shore D | 70 | 69 |
| Hardness, Rockwell R | 85 | 78 |
| Shear Modulus, psi | $5.8 \times 10^4$ | $7.8 \times 10^4$ |
| Tensile Yield, psi | 3800 | 3300 |
| Tensile Modulus, psi | $4 \times 10^5$ | $4 \times 10^5$ |
| Breaking Strength, psi | 5400 | 6800 |
| Elongation to Break, % | 700 | 480 |
| Elongation to Whiteness, % | < 30 | ca. 300 |
| Izod Impact at 0°C ft lbs/in notch | 0.40 | 0.60 |
| Tensile Impact at 23°C, ft lbs | 3.2 | 8.5 |
| Tensile Impact at 0°C, ft lbs | 0.89 | 5.0 |
| Weight Drop Impact at 0°C, inches of fall | ~ 3 | 50 |
| Weight Drop Impact at −20°C, inches of fall | | 36 |
| Weight Drop Impact at 0°C after Annealing at 90°C, inches of fall | | >50 |
| Brittle Point, °C | +6 | −26 |
| Density, g/cc | 0.9000 | 0.8950 |

Effect of Heating

Distortion of test plaques at elevated temperatures was observed by heating 4 inch × 4 inch × 1/16 inch specimens of unrolled sheet and of sheet biaxially cold rolled to 50 percent reduction, and holding each for 5 minutes at various temperatures. Warping or bending of the cold rolled plaques began at about 50°C; warping of cold rolled plaques was more severe than of the control plaques up to about 80° or 90°C. Much of the bending of the rolled plaques is considered to be due to non-uniform macro-stress pattern at the edges; this effect is minimized in larger sheets. Above 90° to 100°C the degree of warping of the control plaques and of the rolled plaques was about the same.

A separate effect of heating is shrinkage of the specimens. Shrinkage is more properly designated "-dimensional recovery" since a biaxially rolled sheet will shrink in the dimensions of length and width but will increase in thickness, i.e., it will tend to recover its shape prior to cold working. Slight, uniform shrinkage is first observed at about 90°–95°C. When a specimen of biaxially cold rolled sheet is heated for 5 minutes at temperatures above about 100°C, a noticeable amount of uniform shrinkage occurs, most of it rather quickly during the first portion of the heating; shrinkage is substantially complete after as little as 5 minutes. Dimensional recovery at 110°C, as measured by increase in thickness at the center of the test plaque, is about 15 percent of the dimension before heating. At 168°C, i.e., the approximate melting point of polypropylene, dimensional recovery, measured after 5 minutes of heating, is 27 percent of the dimension before heating. To illustrate, a sheet reduced by biaxial cold rolling from 100 mil to 50 mil thickness will have a dimensional recovery to a thickness of 63.5 mil upon heating to 168°C.

An important and unexpected property of articles prepared according to this invention is that their greatly improved low-temperature impact resistance is retained after heating so long as they are not heated to the melting point. Specimens of 50 percent reduced biaxially cold rolled sheet, 1/16 inch thick, were heated for 5 minutes at 90°C and 110°C respectively. After heating the samples were tested, using the dropping weight test at 0°C. There was no noticeable decrease in impact resistance and possibly a small improvement.

COLD WORKING CONDITIONS AND METHODS

Reduction in thickness is obtained according to this invention by applications of mechanical pressure at temperatures below the melting point of the polymer. The manner of application of mechanical pressure may vary widely.

A single application of pressure over the whole surface of the article is employed in processes such as closed die pressure-forming, stamping and upsetting. In these processes the desired effect is usually a change in shape. The dimensions of the die may be intricate. Reduction in thickness may be non-uniform or may be absent.

In swaging, pressure is also applied to the total surface but pressure is applied a number of separate times as a rod is fed into or through the swaging dies. The rate of feed of the workpiece should be sufficiently rapid and the swaging stroke sufficiently large to prevent excessive heating. Softening of the workpiece leads to undesired twisting. Preferably a lubricant, such as silicone oil, is employed in swaging.

In cold rolling, pressure is applied essentially along a line as sheet is fed through rolls. The number of separate applications of pressure here is determined by practical limitations on the reduction in thickness possible per pass. Typically from four to 10 passes are required to provide reductions from 40 to 70 percent. As few as two passes or more than ten passes may sometimes be employed. Some tension may be applied to the sheet either ahead of or in back of the rolls, to facilitate rolling. Tension must be less than that which would result in inhomogeneous deformation.

Reduction in thickness in flat shapes, due to application of mechanical pressures according to this invention, should be at least in the range of 40 to 60 percent in order to obtain the full benefits of the invention, consisting in absence of inhomogeneous necking under tension as well as greatly improved impact properties. A reduction in thickness of about 50 percent is preferred for most purposes. The range from 40 to 60 percent is generally suitable. At reductions in thickness of 75 percent or more, some orientation of the formed article in planes perpendicular to the thickness is observed. Although such articles still have high impact resistance, the mode of failure on impact is changed from ductible to brittle. However, the mechanism is different from that of brittle failure of conventional polypropylene articles. Where this property of brittleness is not objectionable, reductions of thickness of up to 95 percent or more, based on the original thickness, may be employed. Some of the advantages of this invention are obtained at reductions in thickness of as little as 10 to 20 percent.

In wire drawing, another operation in which pressure is essentially applied along a line, reduction in area per pass must be kept sufficiently low that no necking occurs. It is usually below 10 percent per pass, based on original area. Total reduction in cross-sectional area may range from 10 to 75 percent, i.e., resulting in articles having from about 90 to 25 percent of the original cross-sectional area; the total reduction in cross-sectional area is preferably between 40 and 70 percent. Preferably a lubricant is employed in drawing. Silicone oils and greases are suitable lubricants.

Forming processes in which partial pressure is applied at a point, e.g., spinning and beading, may also be successfully applied according to this invention.

Apparatus employed and methods of manipulating the work pieces are generally analogous to apparatus and methods of handling metal work pieces in the corresponding metallurgical processes, as described, for example, in "Metals Handbook", American Society for Metals, Cleveland, Ohio, 1948.

The methods of working according to this invention include unidirectional and biaxial cold rolling pressure forming, wire drawing, and swaging, which are discussed elsewhere in this specification in greater detail. The following methods are also included.

In rolling of rods or rod-like shapes, the starting material may be changed in its cross-sectional shape, including reduction in cross section area. Simultaneously, a pattern may be applied to its surface, similar to rolling of steel reinforcing rods. To obtain the full benefit of this invention, the reduction in area should be as specified above for wire drawing.

Rolling of rod-like shapes can be further modified by employing a device known as turk's head, in which the rod is confined on at least four sides simultaneously.

Methods in which solid rods are converted to tubes or pipe include the so-called Mannesmann method and others in which the mandrel is on the inside of the open tube and a rolling or hammering force is applied on the outside. Hammering may serve to modify the shape of tubes, e.g., by introducing corrugation to facilitate coiling, or by thickening ends to facilitate threading.

Rolling or drawing under the conditions of this invention can be applied in the production of tough heavy monofilament, such as bristle for brushes, e.g. for street sweeping machines. Unlike conventional bristles, those produced according to this invention do not form objectionable hinges when accidentally bent.

Cold extrusion is of limited application because the heat resulting from the necessary deformation of the work piece tends to raise it to its melting point. However, this may be prevented by cooling the work piece and, if desired, parts of the extruder. Forward extrusion results in conversion of rod-like shapes into extruded parts of different cross-sectional shape and generally reduced cross-sectional area. Tubes or pipes may be formed in known manner by this method. Back extrusion is used to produce cup-like shapes.

Peening is generally carried out by causing balls, or hammers with hemispherical heads, to impinge with great frequency and moderate force on the surface being treated. The depth to which peening is effective is a function of the conditions, such as size and impact energy of the pressing balls or the like. In a thin article, such as a thin sheet, the whole body may be changed to the modified, tough cold-worked form. In thicker articles only the surface layer may be so modified, but this can greatly strengthen the impact resistance of the article.

In another series of applications, polypropylene is cold worked after being applied as a laminate to a substrate of different material; this includes cold-working of polypropylene-coated metal such as sheets or tubes, cold calendaring of polypropylene-coated paper, and the like. Cold working of polypropylene-coated metal may be accomplished in conventional metal-working machinery.

In a modified method according to this invention, a final application of pressure such as by rolling is carried out with a patterned surface, such as a patterned roll, to produce a relief or embossed design on the finished surface. Similar surface finishes can be achieved by inserting a patterned material, e.g., a sheet of fabric, between the roller and a surface to which pressure is applied while the polypropylene article is being formed.

The temperature at which cold forming operations of this invention are carried out is such that the work piece remains below its melting temperature. Application of mechanical pressure to the work piece causes substantial internal heating. Where it is desired to avoid any softening, it may therefore be of advantage to cool the work piece prior to working it, e.g., by cooling it to about 0°C in an ice bath, or by storing it in a cold chamber prior to working.

It has been found that there is a significant amount of "spring-back" in cold working of polypropylene. It has also been found that springback is significantly less when the work piece is cooled, e.g., to 0°C, before being cold-worked, compared to its being at about 25°C before being worked. Conveniently, where maximum permanent set per pass is desired, the work piece should be at a low temperature, e.g., between 0° and 10°C. Even lower starting temperature may be advantageous.

The methods of this invention can also be applied to articles at elevated temperatures, provided the temperature at all times remains below the melting temperature of polypropylene, i.e., below about 160°C. The temperature of the work piece should be maintained below 140°C, if possible. In general, working at temperatures between 0° and 80°C is preferred. It is also sometimes of advantage to control the temperature of the work piece or of the working surfaces in such a way that the surfaces of the work piece are not heated to the point at which they become soft. If desired, the rolls or other working surfaces themselves may be either chilled or heated in the range from 0°C or less to 150°C. It is sometimes of advantage to lubricate the working surfaces, e.g., with water or aqueous lubricants, or with non-aqueous lubricants, such as silicone oil.

METHODS COMBINING COLD WORKING AND HEATING

The behavior on heating of polypropylene articles prepared according to this invention permits improved manufacturing methods in which cold working and heating are combined for the purpose of producing dimensionally stable cold worked articles.

In one modification a cold worked article is heated at a temperature between 50° and 90°C and maintained at that temperature for at least one minute. This may be while the article is under restraint, such as in a press, to prevent warping. The time required for such a heat treatment will of course vary with the type of article since it is most desirable to heat the article uniformly and heating of large bodies of polypropylene will require a substantial amount of time. The time during which the article is maintained at the desired temperature will also vary, being generally longer at lower temperatures. Times employed may be as little as 1 or 2 minutes after the article has reached the desired temperature up to as long as an hour or more.

In another modification a cold worked article is heated at a temperature above 90°C preferably higher than 100°C and most preferably higher than that at which the article is to be used, so that the dimensions of the article will be stabilized and no substantial further distortion or shrinkage obtained at temperatures of use. Times employed may be in the range from 1 or 2 minutes to an hour or more.

In a further embodiment of the process one of the above described heat treatments of the article is carried out after cold forming and prior to a subsequent additional forming operation, such as deep drawing.

In a further embodiment an article is cold worked according to this invention, subjected to one of the above-described stabilizing heat treatments, then formed in a separate forming operation such as deep drawing, and again heat treated.

METHODS OF UTILIZING ARTICLES OF THIS INVENTION

The products of this invention have several characteristics which permit novel uses of polypropylene. They also have improved properties in applications where they replace conventional polypropylene.

This invention permits the production of finished rolled or drawn shapes such as sheet, pipe, tube, and rod, characterized, i.a., by improved clarity, improved impact resistance, absence of inhomogeneous deformation under tensile stress, and onset of whitening only after 150 percent or more elongation under tension. It also permits the production of tough, intricately formed shapes by pressure forming in open or closed dies.

The products of this invention, particularly biaxially cold rolled sheet, can be converted into useful articles by further conversion processes, e.g., deep drawing, press forging, stamping, embossing and the like.

Deep Drawing

To illustrate the deep drawing capabilities of polypropylene sheet produced according to this invention, the following test was performed. A die was produced for drawing polypropylene sheet to make a cup-shaped depression in the sheet. The nominal die diameter was two inches. The die was lubricated with silicone oil. At drawing speeds up to 1 inch per minute the results obtained with polypropylene sheet, biaxially cold rolled to 50 percent reduction in thickness, were independent of the drawing speed. The drawing depths were from ½ to 2 inches. The elastic spring-back for the deeper draws was of the order of 25 percent of the applied draw depth.

In drawing conventional extruded polypropylene sheet of the same thickness, it was found that deformation takes place in inhomogeneous manner, resulting in a pronounced whitening of the transition zone between the plane of the sheet and the plane of the side wall, and also resulting in substantial thinning of the transition portions and in relatively thin side walls. Drawing of said biaxially cold-rolled polypropylene sheet at the above conditions resulted in no significant amount of whitening and in no excessive thinness of the side wall or transition zones.

Shrink Fitting

To illustrate the possibility of shrink fitting, a portion of cold-rolled 47 mil polypropylene sheet was welded to form a cylinder, placed over a cylinder of smaller diameter and subjected to radiant heating. A smooth shrink-fit was readily obtained.

The same property can be utilized in numerous ways. For example, pipe made of metal or other material can be spirally wrapped with a tape of cold-rolled polypropylene and thereafter heated to produce a tight shrink fit onto the pipe.

In preparing polypropylene for shrink-fitting applications it may at times be advantageous to use uniaxially cold-rolled sheet or other shapes which have been uniaxially deformed according to this invention. Reduction in thickness as high as 95 percent may be advantageous for these applications.

Other applications of polypropylene product of this invention include: pressure forming of sheets, e.g., to produce kick plates or window molding for automobiles; pressing or stamping of cold-rolled sheets; vacuum forming cold rolled sheets; high pressure hydraulic forming as a substitute for blow molding, e.g., in production of containers or shell casings; stamping of crown cap liners for bottles; crimping can lids; shrink fitting tops onto containers; and the like.

ILLUSTRATIVE EXAMPLES

The invention will be further illustrated by the following examples which show methods of processing polypropylene according to the invention. It will be understood that the invention is not limited to the specific illustrations.

Several methods of cold rolling polypropylene sheet according to this invention will be illustrated hereinafter by means of rolling schedules. For purposes of identification, the four directions in which a sheet could be passed into a rolling mill were designed A, B, C and D, direction A being parallel to the direction of extrusion and C being opposite to A. Rolling was carried out on a two high mill, equipped with rolls 4 ½ inches in diameter and ½ inch in width, both driven at 27 rpm, and capable of rolling steel. In Examples 1–3 the same surfaces were retained as upper and lower surfaces, respectively, in all passes.

EXAMPLE 1

4 inch × 4 inch sheets of commercial general purpose grade of polypropylene, having an I.V. of about 3 dl/g, extruded to nominal ⅛ inch thickness (actual thickness 0.124 inch), were rolled to nominal 1/16 inch thickness according to the schedule shown in Table 4. The sheets were allowed to come back to room temperature after each pass and trimmed back to 4 inch × 4 inch size after each rolling. Nominal rolling temperature was 26°C. Four passes of each sheet were made at each roll spacing. Due to "spring-back", the permanent thickness, even after four passes, was substantially greater than the roll spacing. It was observed that each of the four passes at a given setting resulted in some reduction in thickness but most of the reduction in thickness occurred in the first of the passes.

TABLE 4

ROLLING SCHEDULE

| Roll Spacing inches | Sequence of Directions of the Four Passes at Given Roll Setting | Specimen Thickness Inches after Sequence of Four Passes at Given Roll Setting |
|---|---|---|
| 0.105 | A B C D | 0.1170 |
| 0.095 | B C D A | 0.1102 |
| 0.085 | C D A B | 0.1023 |
| 0.075 | D A B C | 0.0938 |
| 0.067 | A B C D | 0.0861 |
| 0.058 | B C D A | 0.0779 |
| 0.049 | C D A B | 0.0688 |
| 0.041 | D A B C | 0.0601 |

The completed samples were held 5 days at 77°F and 50 percent relative humidity prior to testing. Average properties of these samples are shown in Table 3 above.

EXAMPLE 2

Similarly to Example 1, sheets of the same size and having an actual initial thickness of 0.123 inch were rolled by the schedule shown below in Table 5 to a final thickness of 0.058 inch. These sheets were kept in ice water between passes. Their nominal temperature was 0°C. The rolls were water wet during rolling.

TABLE 5

ROLLING SCHEDULE

| Roll Spacing, inches | Rolling Direction | Specimen Thickness After Rolling, inches |
|---|---|---|
| 0.085 | A | 0.1092 |
| 0.070 | B | 0.0946 |
| 0.058 | C | 0.0835 |
| 0.049 | D | 0.0727 |
| 0.046 | A | 0.0678 |
| 0.043 | B | 0.0634 |
| 0.040 | C | 0.0606 |
| 0.038 | D | 0.0580 |

The properties of these samples were substantially the same as given in Table 3.

EXAMPLE 3

Similarly to Example 2, sheets of the same size and 0.124 inch thick were rolled to a final thickness of 0.059 inch, according to the schedule shown in Table 6.

TABLE 6

ROLLING SCHEDULE

| Roll Spacing, inches | Rolling Direction | Specimen Thickness After Rolling, inches |
|---|---|---|
| 0.085 | A | 0.1100 |
| 0.070 | B | 0.0950 |
| 0.058 | A | 0.0840 |
| 0.049 | B | 0.0736 |
| 0.046 | A | 0.0686 |
| 0.043 | B | 0.0646 |
| 0.040 | A | 0.0614 |
| 0.038 | B | 0.0590 |

The properties of these samples were substantially the same as given in Table 3.

EXAMPLE 4

Example 2 is repeated with reversal of sides after the first cycle of passes, in other words, the plaque is reversed after the first four passes so that the bottom side becomes the top. The impact and tensile properties of the rolled plaque are not changed significantly. No change would be expected, since the two rolls moved at identical speeds.

EXAMPLE 5

Several one inch wide strips of commercial general purpose grade polypropylene was rolled unidirectionally.

Strips of material having melt flow of 4 were reduced from 95 to 20 mil in one pass and in multiple passes, respectively. All rolled strips had essentially the same properties. See-through clarity was greatly improved, particularly in strips reduced in multiple passes. The strips could be repeatedly flexed 180 degrees when chilled to about −5°C, whereas conventional polypropylene shattered on a single flexing of 90° at −5°C. At room temperature the strips did not whiten when bent 180° on a transverse line, but did whiten when bent 180° in the line of the machine direction.

Similar results were obtained with polypropylene having melt flow of 1, but the reduction in thickness per pass, at otherwise similar conditions, was less.

It was also found that the intrinsic viscosity of the rolled product was not changed by rolling.

In some runs, a fabric was placed between the sheet and the roll. The rolled sheet showed the fabric design in relief.

EXAMPLE 6

A nominally ¼ inch diameter extruded polypropylene rod (actual diameter 0.2525 inch) was drawn at room temperature at the rate of 12 ft/min. through a series of wire drawing dies, lubricated with silicone grease. At one stage partially drawn rod was submitted to two swaging steps. The drawing schedule, dimensions, area reductions and yield strength in psi are given in Table 7.

It was found that inhomogeneous necking was not observed when rods thus reduced by drawing to 40 percent of their original area were tested.

TABLE 7

| die size, inch | Rod Diameter After Drawing, inch | % reduction in Area | Yield Strength, psi |
|---|---|---|---|
| | | 0 | 5070 |
| 0.245 | 0.252 | | |
| 0.235 | 0.242 | | |
| 0.220 | 0.234 | 13 | 5010 |
| 0.205 | 0.220 | | |
| 0.200 | 0.217 | 25.4 | 5130 |
| 0.190 | 0.209 | 32 | 5380 |
| 0.182 | 0.198 | 38 | 5820 |
| 0.156 | 0.170 | | |
| 0.150 | 0.165 | 57 | 7230 |
| 0.145 | | | |
| (swage) | | | |
| 0.125 | | | |
| 0.120 | 0.128 | 73 | 17,800 |

Similar properties are observed when the two swaging steps are replaced by further wire-drawing steps.

EXAMPLE 7

Extruded polypropylene rod of nominally ¼ inch diameter was successfully reduced in size by repeated passes in which it was hand-fed through a metal-swaging mill. The rod was lubricated with silicone oil. The rate of feed was such that each segment of rod received about 10 impacts per pass.

EXAMPLE 8

A 1/16 inch sheet of polypropylene was peened by supporting it on a hard surface and repeatedly hitting it by hand with a ball peen hammer. The peened sheet was slightly reduced in thickness. Its clarity was improved and its toughness considerably improved, as indicated by the fact that it did not whiten on bending.

EXAMPLE 9

A wheel having about a ⅛ inch thick web and ¼ inch hub and rim, with a steel pin serving as shaft through the hub, was formed by pressing in a closed die. The starting work piece was a disc cut from ¼ inch extruded polypropylene sheet, having a central hole somewhat larger than the steel pin which served as shaft. The finished product was the described wheel in which the pin was tightly fitted.

I claim as my invention:

1. A method of producing extruded shapes of polypropylene having improved physical properties which comprises extruding shapes of stereoregular solid polypropylene through a die while maintaining the temperature thereof below the melting temperature.

* * * * *